Dec. 30, 1930.    L. THOMPSON    1,787,290
ELECTROMAGNETIC PICK-UP DEVICE FOR PHONOGRAPHIC RECORDS
Filed Jan. 7, 1930
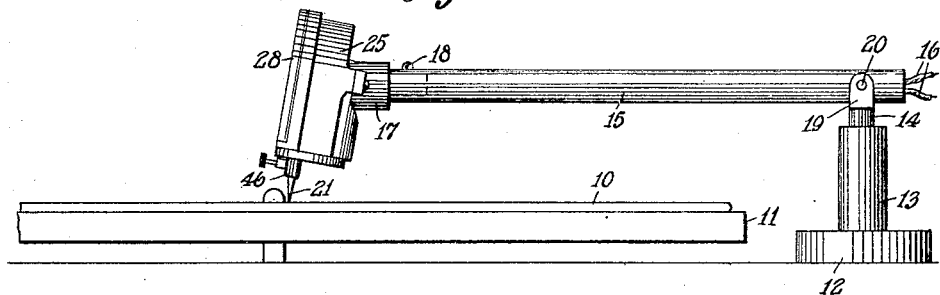
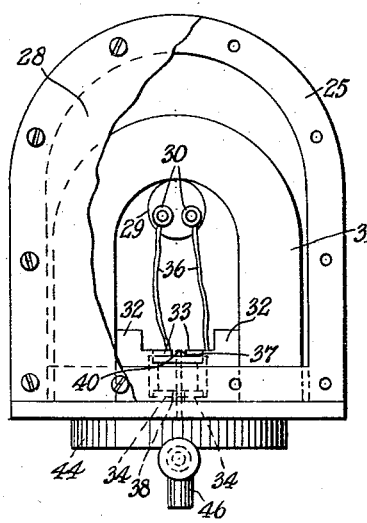
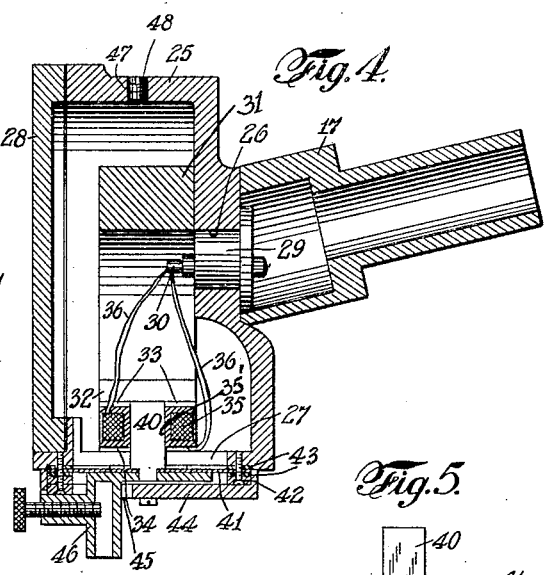
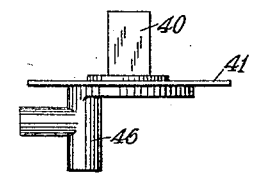
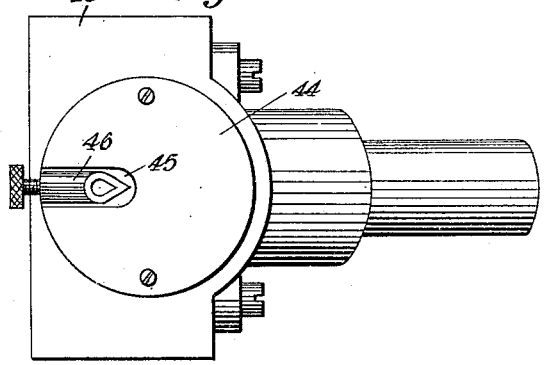
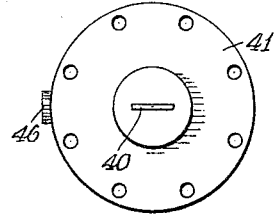
INVENTOR
LINCOLN THOMPSON
BY
ATTORNEY Patented Dec. 30, 1930

1,787,290

UNITED STATES PATENT OFFICE

LINCOLN THOMPSON, OF NAUGATUCK, CONNECTICUT, ASSIGNOR TO WM. H. BRISTOL TALKING PICTURE CORPORATION, OF WATERBURY, CONNECTICUT, A CORPORATION OF CONNECTICUT

ELECTROMAGNETIC PICK-UP DEVICE FOR PHONOGRAPHIC RECORDS

Application filed January 7, 1930. Serial No. 419,009.

The invention relates to apparatus utilized in the reproduction of sound; and more especially to an electrical transmitter unit for use with phonographic records of the lateral-cut type, the grooves of which are adapted to impart an oscillatory movement to a stylus member operating therein.

It has for its object certain improvements in a pick-up device of the nature set forth in a prior U. S. Patent, No. 1,637,165, granted to me and Joseph B. Marshall, as assignors to The Bristol Company. In this said patent there is disclosed a torsionally secured reed member which extends through a transmitter coil and air gap between the pole pieces of a magnet, said reed being adapted for vibration by a stylus to cause electric currents to be generated within the said coil. Such currents, being usually of insufficient magnitude to operate the ordinary existing receiver devices with the desired volume, are generally amplified to the required extent by any of the well-known expedients.

The said improvements involved in the novel pick-up device contemplate a support of a disk-like nature for the reed and stylus holder rather than a shaft support, as in the earlier embodiment; and, furthermore, a sealed casing for the said reed to contain a suitable damping liquid therefor, the said disk not only affording the torsional support for the reed but serving to seal off, also, the casing at the reed and stylus holder connection.

This is conveniently effected by providing, for example, a circular outlet in the bottom of the casing retaining the magnet and transmitting coil of the pick-up; and mounting over said opening a flexible disk secured rigidly at its circumference to the casing, said disk having projecting centrally therefrom into the casing and through the transmitting coil and between the pole pieces a reed of soft iron, while from the opposite face of the disk projects outwardly a stylus holder fixedly secured eccentrically thereto. Oil or other liquid of suitable consistency is retained by the casing so as to entirely immerse the pole pieces, transmitting coil and reed therein, and thus serving to damp the vibrating parts and eliminate the effect of natural frequencies of the same. Moreover, an outlet for the conductors from the transmitting coil is provided in the casing, and is also suitably sealed to prevent leakage therefrom, while a filling opening with removable plug is arranged in the casing to admit the damping liquid into its interior.

The nature of the invention, however, will best be understood when described in connection with the accompany drawings, in which:

Fig. 1 is a side elevation of the novel pick-up device and mounting therefor, and shows also a stylus of said device in engagement with a phonographic record.

Fig. 2 is a front elevation of the pick-up device, with cover plate broken away to disclose the interior.

Fig. 3 is an underneath view.

Fig. 4 is a transverse vertical section through the pick-up device.

Fig. 5 is a front elevation of the reed, stylus holder and supporting diaphragm.

Fig. 6 is a plan thereof.

Referring to the drawings, the novel pick-up device is arranged to be mounted in any suitable manner for floating over the top of the phonographic record 10 of the well-known lateral-cut, disk type and arranged to be carried by a turn-table 11 by which it may be rotated in manner well understood. Any suitable means for thus supporting the pick-up device with reference to the turn-table and record thereon may be utilized; and in the drawings there is indicated a standard or base 12 of substantial proportions, the same having a socket 13 which is designed to receive a forked pin 14 for rotation therein so that the pick-up device may be caused to swing freely in a horizontal plane. The latter is designed, also, to be carried for this purpose by an arm 15, preferably in the form of a tube through which the outgoing leads or conductors 16 may be brought for connecting the pick-up device with the external circuits and apparatus (not shown). The pick-up end of the arm 15, moreover, is adapted to fit over an outlet tube 17 of the pick-up for rigidly securing it to the arm as by means of a set screw 18. The opposite or inner end of this arm is pivotally secured to the upper end of pin 14 to provide for a universal joint which pin, for this purpose, terminates in a bifurcated portion 19 having inwardly directed studs 20 upon which the arm 15 may rock in a vertical plane as in inserting the stylus 21 of the pick-up member in the grooves of the record 10 and removing the same therefrom.

The pick-up member comprises a casing 25 having a conductor outlet 26 through the back of said casing and an opening 27 in the bottom thereof, while a removable plate 28 is secured over the front of the casing. A plug 29 of insulation seals the outlet 26 and has a pair of terminal posts 30 extending therethrough, while the opening 27 is also adapted to be closed, as hereinafter set forth, so that the entire casing becomes sealed thereby for the purpose of retaining a suitable damping liquid such as a heavy oil.

Within the casing, furthermore, is mounted a magnetized member 31, preferably of the U or horse-shoe magnet type, and also preferably permanently magnetized. The ends of this magnet rest upon the bottom of the casing at either side of the opening 27 therethrough and have attached thereto pole pieces 32 inwardly directed over the opening 27 with upper and lower pairs of plates 33 and 34 respectively. The said plates provide an intermediate recess in the poles for retaining between them an annular bobbin or transmitting coil 35, conductors 36 from which are attached the inner ends of the terminal posts 30 for outside connection to the conductors 16.

The passageway 35' through the bobbin is rectangular in cross-section and registers with the air gaps 37 and 38 respectively between the pair of upper plates and between the pair of lower plates so that a through passageway into the interior of the casing is afforded by the opening 27 centered therewith.

Into the aforesaid passageway and the air gaps is inserted a flattened reed member or armature 40 of soft iron, the same being designed to be positioned by a flexible support to secure a torsional mounting on the casing, and at the same time effect the closing of opening 27 for completing the seal of the said casing. To this end, the reed is centrally attached to a flexible diaphragm member or circular disk 41, as of steel or phosphor bronze, to project at right angles from its inner face, the said disk being secured to the casing over opening 27 by a metal ring 42 with interposed oil-proof gaskets 43. A metal finishing cap 44 is provided over the said disk, being secured to the ring 42 and provided with a radial slot 45 to accommodate a stylus holder 46, secured to the outer face of the disk preferably eccentrically thereof and extending at right angles thereto to receive and hold the stylus 21.

It will be observed that the said holder and reed constitute an integral unit with the said disk which serves the double purpose of affording a torsional support for the reed relatively to the magnetized and transmitting elements and to seal the casing so that the elements within the same may be immersed in oil or other suitable liquid to damp the vibrating parts and eliminate the effect of natural frequencies of such parts.

To admit of convenient filling of the casing with such damping liquid, a filling opening 47 may be arranged in the casing wall and normally closed by a removable plug 48. In the manufacture of the novel pick-up device, furthermore, the same is assembled with the oil-tight surfaces preferably shellacked, and the unit is then baked with the filling plug removed, whereupon the oil or other damping liquid is introduced through the filling opening 47 and the plug 48 returned to seal the casing.

Normally, the said disk maintains the reed in its neutral position substantially midway of the air gaps; but when the stylus operates in the grooves of the record 10 the said reed oscillates about the disk as a torsional axis and its movements shift the flux up and down therein and thus change the flux passing through the transmitting coil to induce thereby currents in said coil in accordance with the movements of the stylus, as is well understood.

I claim:

1. An electrical transmitter for phonographs, comprising a closed casing having an opening therethrough, a magnet having separated cooperating pole pieces extending over said opening, a transmitting coil carried by the pole pieces and having a passageway therethrough coaxial with the said casing opening and the gap between the pole pieces, a flexible member secured to the casing over its opening to seal the same, a reed of soft iron fixedly secured to the inner face of the flexible member which affords a pivot therefor, said reed extending through the passageway of the transmitting coil and the said gap, and a stylus holder fixedly secured to the outer face of the flexible member.

2. An electrical transmitter for phonographs, comprising a closed casing having an opening therethrough, a permanent U-shape magnet mounted in the casing with separated pole pieces at its ends and extending over said opening, a transmitting coil carried by the pole pieces and having a passageway therethrough coaxial with the said casing opening and the gap between the pole pieces, a flexible member secured to the casing over its opening to seal the same, a reed of soft iron fixedly secured to the inner face of the flexible member and extending through the passageway of the transmitting coil and the said gap, and a stylus holder fixedly secured to the outer face of the flexible member.

3. An electrical transmitter for phonographs, comprising a closed casing having an opening therethrough, a magnet having separated cooperating pole pieces recessed at their outer ends and extending over said opening, a transmitting coil retained in the recesses of the pole pieces and having a passageway therethrough coaxial with the said casing opening and the gap between the pole pieces, a flexible member secured to the casing over its opening to seal the same, a reed of soft iron fixedly secured to the inner face of the flexible member and extending through the passageway of the transmitting coil and the said gap, and a stylus holder fixedly secured to the outer face of the flexible member.

4. An electrical transmitter for phonographs, comprising a closed casing having an opening therethrough, and an outlet for conductors, an insulation plug sealing said outlet, terminal posts extending through the plug, a magnet having separated cooperating pole pieces extending over said opening, a transmitting coil carried by the pole pieces and having a passageway therethrough coaxial with the said casing opening and the gap between the pole pieces, conductors connecting said transmitting coil with the said terminal posts, a flexible member secured to the casing over its opening to seal the same, a reed of soft iron fixedly secured to the inner face of the flexible member and extending through the passageway of the transmitting coil and the said gap, and a stylus holder fixedly secured to the outer face of the flexible member.

5. An electrical transmitter for phonographs, comprising a closed casing having an opening therethrough, a magnet having separated cooperating pole pieces extending over said opening, a transmitting coil carried by the pole pieces and having a passageway therethrough coaxial with the said casing opening and the gap between the pole pieces, a flexible member secured to the casing over its opening to seal the same, a reed of soft iron centrally secured to the inner face of the flexible member and extending through the passageway of the transmitting coil and the said gap, and a stylus holder eccentrically secured to the outer face of the flexible member.

6. An electrical transmitter for phonographs, comprising a closed casing having an opening therethrough and an outlet for conductors, an insulation plug sealing said outlet and terminal posts extending therethrough, a magnet having separated cooperating pole pieces extending over said opening, a transmitting coil carried by the pole pieces and having a passageway therethrough coaxial with the said casing opening and the gap between the pole pieces, conductors connecting said transmitting coil with said terminal posts, a flexible member secured to the casing over its opening to seal the same, a reed of soft iron fixedly secured to the inner face of the flexible member and extending through the passageway of the transmitting coil and the said gap, a stylus holder fixedly secured to the outer face of the flexible member, and a removable plug fitted in a filling opening of the casing to allow of filling the latter with a damping liquid.

In testimony whereof I affix my signature.

LINCOLN THOMPSON.